United States Patent [19]
Truett et al.

[11] Patent Number: 5,338,935
[45] Date of Patent: Aug. 16, 1994

[54] POSITIONING DEVICE FOR INFRARED ACCESSORIES IN FTIR SPECTROMETERS

[76] Inventors: William L. Truett, P.O. Box 2162, West Brattleboro, Vt. 05302; Jeffrey L. Tosi, 42 Oak Hill Acres, Hinsdale, N.H. 03451

[21] Appl. No.: 951,138

[22] Filed: Sep. 25, 1992

[51] Int. Cl.⁵ .................................. G01N 21/35
[52] U.S. Cl. .................... 250/339.06; 356/346; 356/244
[58] Field of Search ............... 250/339; 356/346, 244, 356/246

[56] References Cited

U.S. PATENT DOCUMENTS

| | | | |
|---|---|---|---|
| 3,491,366 | 1/1970 | Harrick | 356/300 |
| 3,540,025 | 11/1970 | Levin et al. | 340/583 |
| 4,595,833 | 6/1986 | Sting | 250/339 |
| 4,732,475 | 3/1988 | Harrick | 356/244 |
| 4,883,356 | 11/1989 | deMay, II | 356/346 |
| 5,015,092 | 5/1991 | Sting | 356/300 |
| 5,153,675 | 10/1992 | Beauchaine | 356/346 |

FOREIGN PATENT DOCUMENTS 3715481  11/1988  Fed. Rep. of Germany ...... 356/246

OTHER PUBLICATIONS

SPECAC-XYZ sample positioning stage–1983–2 pages, Analytical Accessories Limited, Orpingto Kent, United Kingdom.
NICOLET-FTIR Accessories–1991 pp. 19–20,–Advanced Horizontal ATRS.
Mirabella et al, Internal Reflection Spectroscopy–Review & Supplement, Harrick Scientific corp., 1985, pp. 94 and 126.
Harrick Internal Reference Spectroscopy, Interscience Publishers, N.Y., 1967, pp. 100–101.

*Primary Examiner*—Carolyn E. Fields

[57] ABSTRACT

A positioning device for optimal positioning of infrared accessories, usable in all FTIR spectrometers, in the X-Y-Z planes of the spectrometer with an additional angular adjustment in the X-Y plane in order to optimize the infrared energy reaching the spectrometer detector. All accessories are mounted on the sample stage of the positioning device by means of a single positioning pin and all accessories are equipped with a blocking shield which assures that all energy which reaches the detector of the spectrometer has transited the attenuated total reflectance crystal.

18 Claims, 8 Drawing Sheets

POSITIONING DEVICE FOR INFRARED ACCESSORIES IN FTIR SPECTROMETERS

BACKGROUND OF THE INVENTION

1. Field of the Invention

The present invention relates to a positioning device and a group of accessories for use in conjunction with a spectrometer. More particularly, the invention is used in conjunction with a Fourier Transform IR Spectrometer (FTIR) and possesses an X-Y-Z translation state with the added capability of an angular adjustment in the X-Y plane, which enables the use of a large group of precisely geometrically tailored accessories. The accessories are mounted on the translation stage and enable the spectroscopist to obtain IR spectra of liquid, solid and gas samples as desired.

2. Description of Prior Art

IR analysis requires that a liquid, solid or gas sample be placed in a suitable sampling device, known as an IR accessory, and positioned in a beam of IR light in the sample compartment of an IR spectrometer.

Prior to 1980, IR spectrometers required minutes to obtain a spectrum and the energy in the instrument was low. As a result, a number of accessories were developed for enhancing the IR energy incident upon the sample by using a small auxiliary optical bench with a multiplicity of mirrors and lenses. One device in wide use, termed a beam condenser, focused the energy beam in the IR spectrometer to a small diameter in order to determine spectra of samples as small as a few square millimeters.

A second type of accessory device in wide use from the early 1960's is ATR (Attenuated Total Reflectance) in which a solid sample such as plastic or fiber or a liquid sample is placed in optical contact with a flat optical plate of well defined geometry. Sting, U.S. Pat. No. 5,015,092 (assigned to Spectra-Tech, Inc.) summarizes the present state of the art. A series of books by James A. Harrick explores fully the multiplicity of these devices. In all cases it is essential that four or more mirrors are required to precisely focus light on the sample being investigated. The ATR accessories are difficult to focus, are expensive and require that the device be geometrically matched to the particular IR spectrometer being used, of which there are several manufacturers and many types. The ATR crystals necessary have been summarized by Wilks, a pioneer in the field, in 1980 and consist of a flat plate with parallel sides, trapezoidal or parallelogram in cross section, and cylindrical elements.

With regard to precise sample positioning in the IR spectrometer sample beam, a single X-Y-Z positioning device was developed for microsampling with an FTIR instrument. Spec Ac, in the early 1980's briefly marketed a small X-Y-Z sampling stage capable of accommodating a micro sample of solid, liquid or gas. The device was particularly tailored to one type of IR spectrometer, and had no provision for blocking stray radiation from reaching the detector of the IR instrument. It is essential that all radiation which reaches the detector of the IR instrument has transited the attenuated total reflectance crystal. Stray radiation vitiates all the quantitative features of an IR spectrum. There was no provision for angular adjustment.

SUMMARY OF THE INVENTION

It is the object of the present invention to provide a new and improved method of positioning accessories which are utilized in obtaining liquid, solid and gas spectra via spectrometers. Although the invention applies particularly to FTIR spectrometers, it is also applicable to all spectrometers, including Raman, UV (ultra violet) visible, NIR (near infrared) and grating IR.

A more particular objective is to position precisely any IR accessory used for the purpose of determining IR spectra of liquids, solids and gases. This is accomplished by placing said IR accessory on the mounting stage of an X-Y-Z translation device by means of a mounting pin. The X-Y-Z translation stage has screw adjustments which permit the stage to be moved into a desired position in the IR spectrometer sample compartment. This is done by means of adjusting the X-Y and Z positioning screws. A second critical set of adjustments, which is very essential, is an adjustment in the X-Y plane in order to precisely direct the energy emanating from the accessory to the detector of the IR instrument.

In all cases of use of the sample positioner, it is necessary to optimize the energy reaching the detector of the FTIR instrument via monitoring the energy meter which is present on all FTIR spectrometers. In general, an energy meter reading equivalent of 5% to 10% will yield an adequate spectrum; it is customary when employing an FTIR spectrometer to determine multiple scans which are coded via a computer to enhance the quality of the spectra obtained.

All sampling accessories are designed to be mounted on the same mounting pin, and all can be adjusted in the same fashion. Further, the sample positioning device can be used with all commercial spectrometers; this is in contrast to all other optical benches with mirrors which require geometrically adapting the accessory to each type of FTIR spectrometer.

The simplicity of the presently discussed positioning device renders it far more economical than the optical benches employing a multiplicity of mirrors. An additional critical feature of the sample positioning device is that all accessories used are fitted with a simple slit device such that only energy which transits the attenuated total reflectance crystal reaches the detector of the FTIR instrument. No stray radiation can be present to destroy the quality of the spectrum.

A surprise finding when utilizing the ATR sampling device in which the ATR plate is in the horizontal position has been that the plate need not be flat. This flatness is noted in J. A. Harrick, Internal Reflection Spectroscopy, Johm Wiley, 1967, and later works as an absolute necessity. It has been found that a plano-concave plate, in which one or more concave areas are present, functions well to accommodate small liquid samples only a fraction of a milliliter in volume. These concave plates precisely define the volume of solvent required giving excellent quantitative reproducibility. This is in marked contrast to the usual ATR plates used in the horizontal mode which require several milliliters of sample. A further advantage of the plano-concave plate is that two or more liquids can be placed in the concavity and the course of the reaction followed for a period of hours by the addition of a small cover plate on the concavity.

DETAILED DESCRIPTION OF THE PREFERRED EMBODIMENTS

Figure 1:
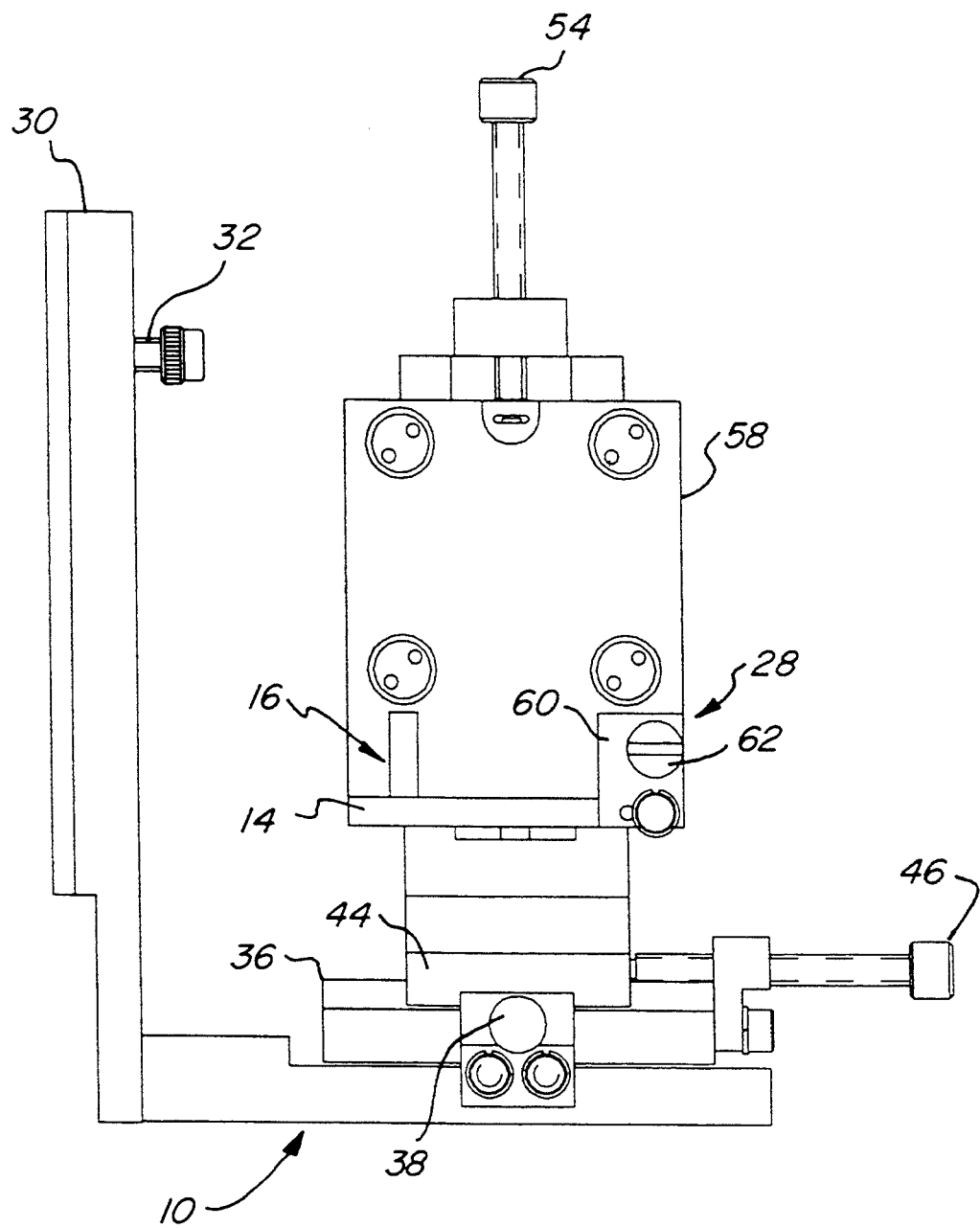
FIG. 1 is an elevational view of a sample positioning assembly embodying the present invention.
Figure 2:
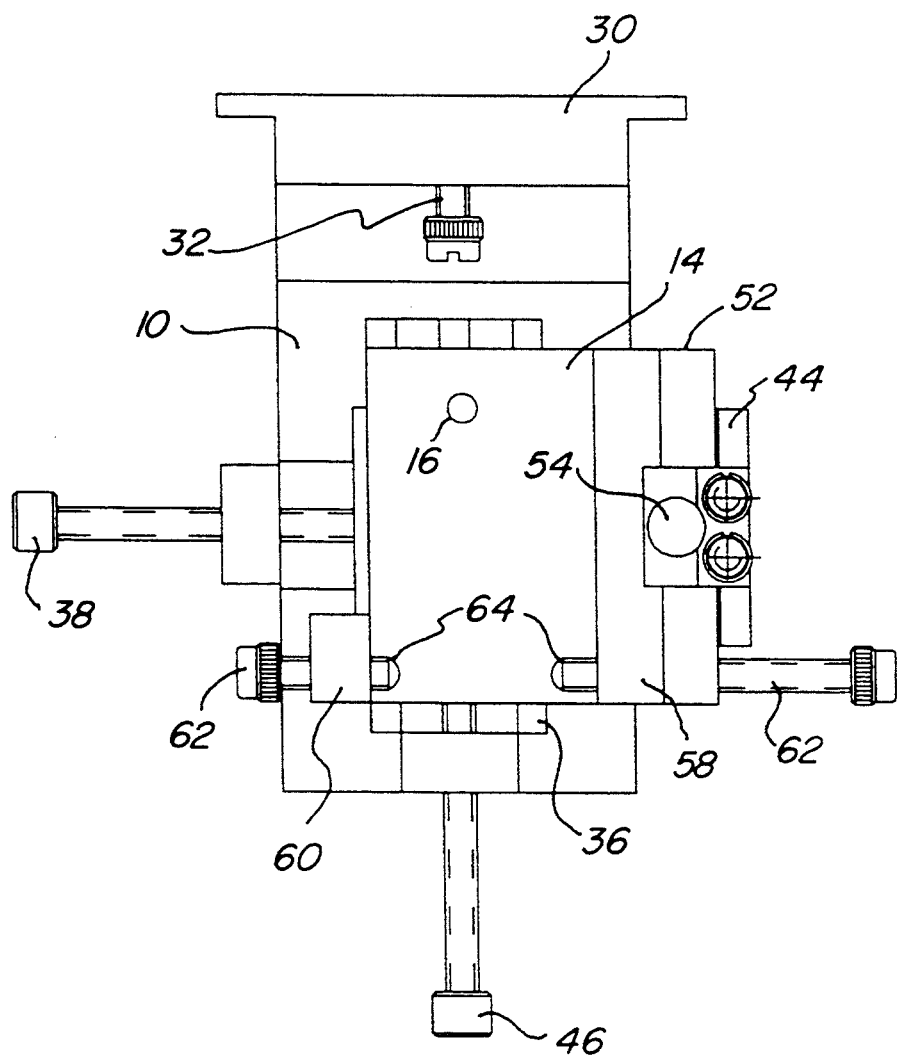
FIG. 2 is a plan view thereof.

Turning first to FIGS. 1 and 2, a sample positioning assembly embodying the present invention is illustrated therein as having a base 10 including an X, Y, and Z axes positioner, generally designated by the numeral 12, for moving a sample or translation stage 14 in X, Y and Z axes relative to the base 10.

A vertical pin 16 on the stage 14 pivotally, for movement with the stage 14, mounts one of a variety of sample holders such as those seen in FIGS. 3–6 and 11–12.

An actuating assembly generally designated by the numeral 28 provides controlled pivotal movement of the sample holder about the pin 16 or Z axis and its retention in a controlled position relative to the stage 14.

The base 10 is maintained in a fixed position relative to a spectrometer by means of the cell slide plate 30, positioned at right angles to the base 10 and secured to the spectrometer by means of the screw 32.

The X, Y and Z axes positioner is of conventional design and has three slidable members 36, 44 and 52 for movement of the stage along the X, Y, and Z axes, respectively. Movement of the members 36, 44 and 52 is controlled by adjusting screws 38, 46, and 54, respectively. A vertical support bracket 58 on the stage 14 is secured to the slidable member 52.

The actuating assembly 28 has two screws 62 mounted on opposite sides of the stage 14 with tips 64 which bear upon opposite the sample holder. One of the screws 62 is supported by a support bracket 60 of the stage 14 and the other is mounted on the vertical support bracket 58. The screws 62 are moveable towards and away from each other to pivot the holder about the pivot pin 16 relative to the stage 14 and thereafter to retain the holder in a controlled position relative to the stage 14.

Figure 3:
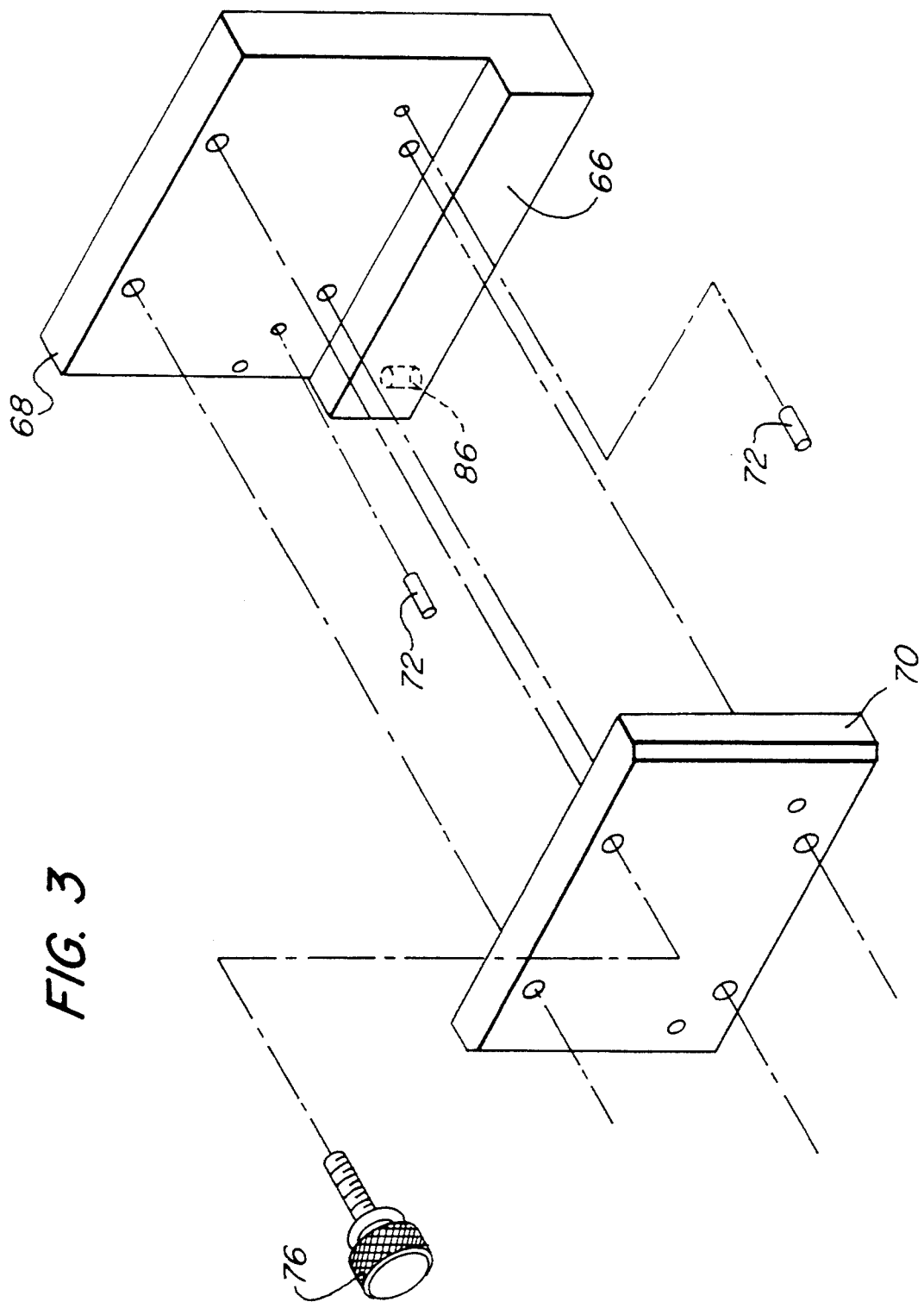
FIG. 3 is an exploded fragmentary perspective view of a sample holder for solid samples embodying the present invention and drawn to an enlarged scale.

FIG. 3 depicts the ATR solid sample holder 18, which employs a 50×20×2 mm ATR plate or crystal 74, 98, 128 or 152 of trapezoidal or parallelogram cross section seated thereon as best seen in FIGS. 7A–10C. Solid samples (not shown) such as films, plastics, fiber or elastomers can have their IR spectra determined by placing said samples in this device on one or both sides of the ATR plate, closing the device by means of four screws 76 in the drilled holes in the two halves of the holder defined by a base 66 and first vertical wall 68 as the first half and a second wall 94 as the second half. The blocking shield 102 with a slit 104 (seen in FIG. 4) is positioned at one end of the sample holder 18, and the slit 104 is aligned with the end of the crystal. This limits radiation from reaching the detector (not shown) which has not transited and exited the end of the ATR plate positioned between the walls 68, 94. The blocking shield is affixed to the solid sample holder 18 via the pin 108 and screw 106. The pins 72 position the ATR plate in the solid sample holder 18. The pin hole or recess 86 is used to position the holder 18 on pin 16 of FIG. 1.

For operation, the solid sample holder 18 with ATR plate and samples (not shown) is positioned on the translation stage 14, the energy optimized via adjustments in the X-Y-Z planes followed by a rotational adjustment in the X-Y plane and the spectrum determined.

Figure 4:
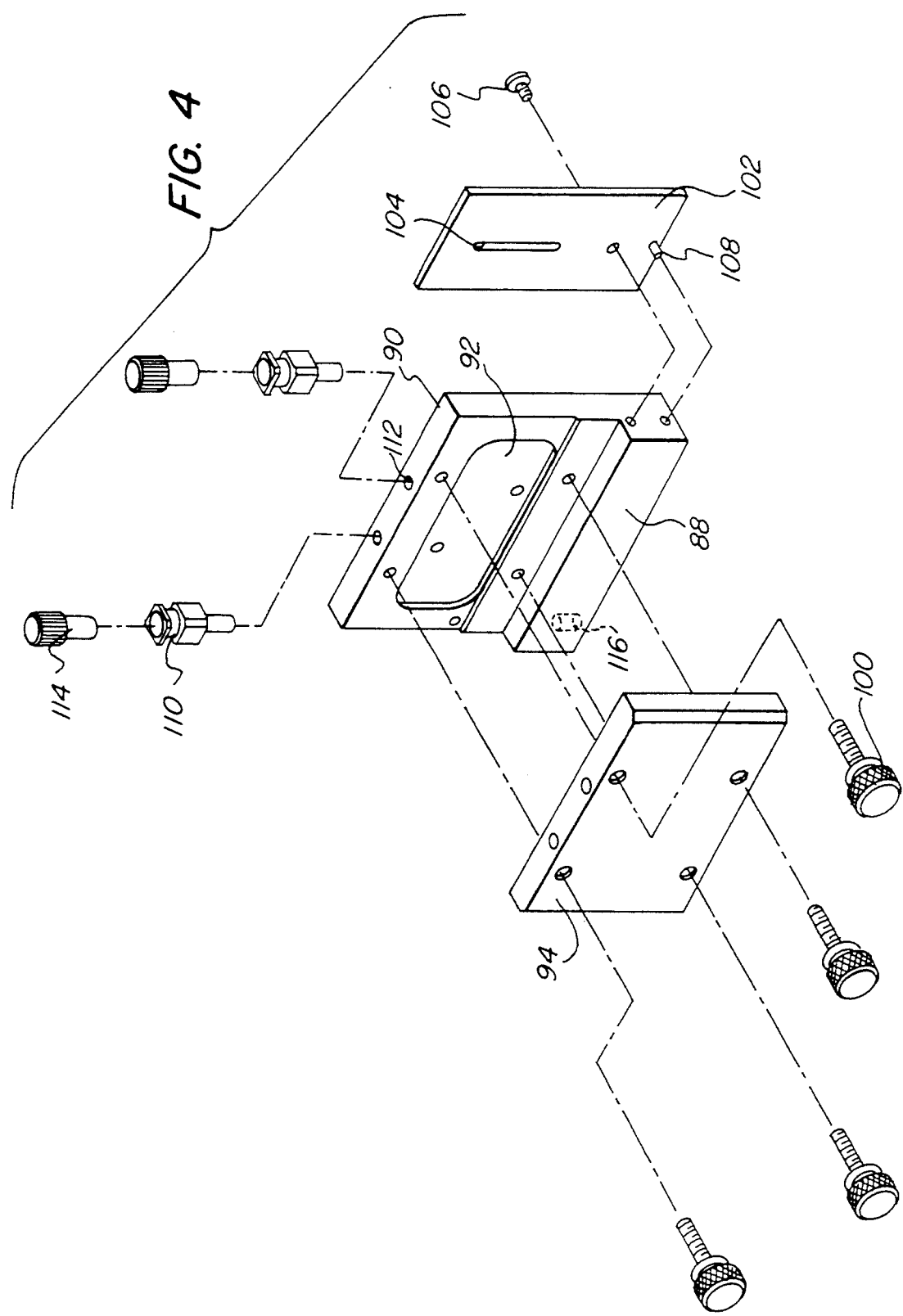
FIG. 4 is an exploded perspective view of a sample holder for liquid samples embodying the present invention and drawn to an enlarged scale.

FIG. 4 depicts the liquid sample holder 20 which is employed to determine the spectra of liquid samples (not shown). The holder 20 employs a 50×20×2 mm ATR plate (74, 98, 128 or 152 of FIGS. 7A–10C) of parallelogram or trapezoidal cross section. Liquid samples (not shown) are of all sorts including strongly absorbing samples such as aqueous solutions. The front plate or second wall 94 is attached to the rear plate or upstanding wall 90 on base 88 by means of four screws 100 and a Teflon gasket (not shown) prevents leakage. The liquid is injected into the cell (not shown) formed by aligned recesses or compartments 92 in walls 90 and 94 via ports 112 which contain hypodermic syringe fittings 110 sealed with plugs 114. The compartments 92 hold a sample in contact with the crystal 74, 98, 128 or 152. The mounting receptacle or recess 116 in the base 88 of the rear plate 90 mounts the liquid holder 20 on the translation stage 14 seen in FIG. 1. The blocking plate or shield member 102 with slit 104 is attached to the liquid holder 20 via pin 108 and screw 106 at one end thereof with the slit aligned with an end of the ATR plate, and permits only that energy to reach the detector (not shown) which has transited and exited the end of the ATR plate.

For operation the liquid holder cell (not shown) is filled with liquid (not shown) via the injection ports 112 with the ATR plate present, positioned on the translational stage 14 and the energy optimized by adjustment in the X-Y plane. The spectrum is then determined.

Figure 5:
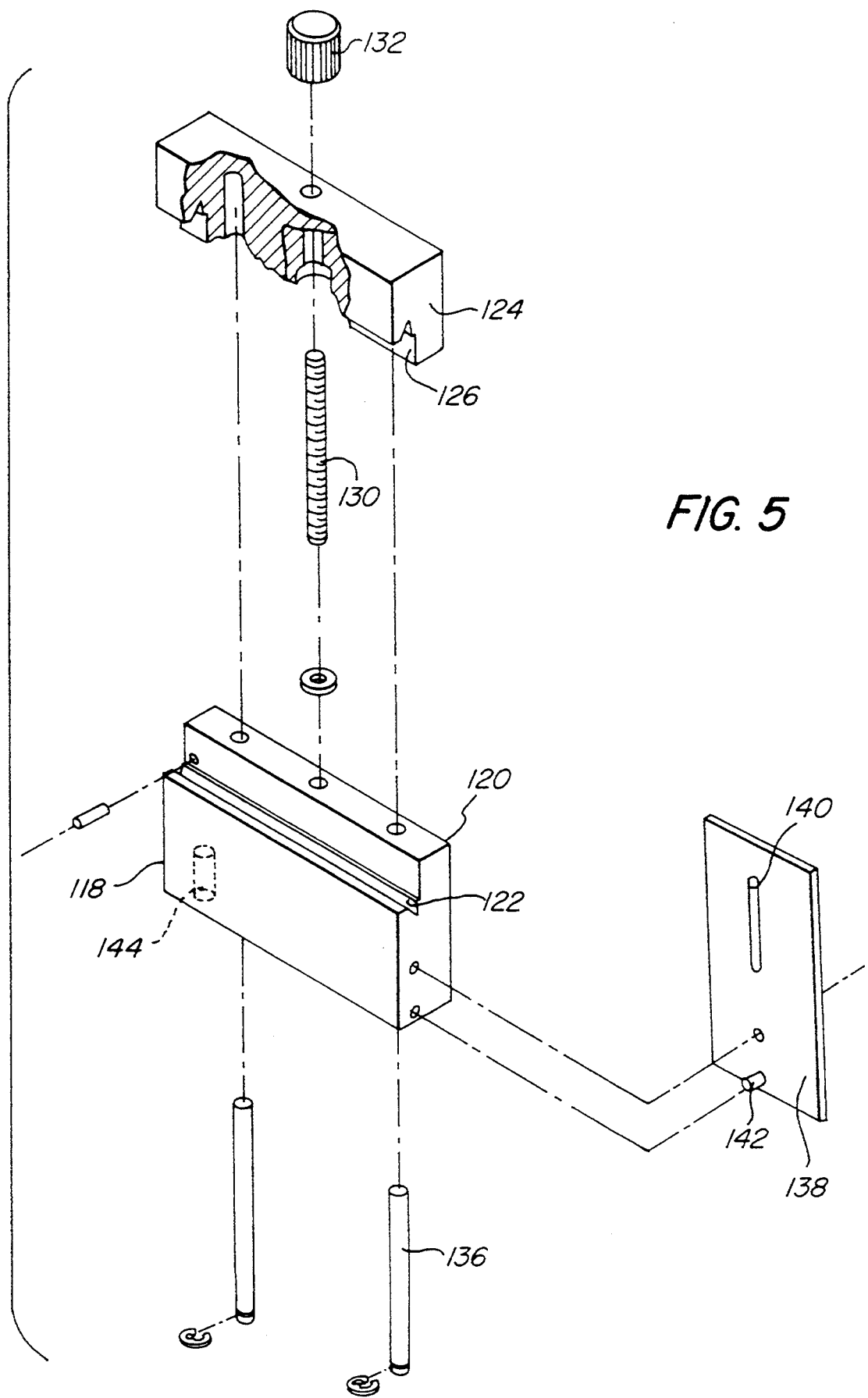
FIG. 5 is an exploded perspective view of a sample holder or self-adhering samples embodying the present invention and drawn to an enlarged scale.

The self adhering sample holder 22 is shown in FIG. 5 and utilizes an ATR plate 74, 98, 128 or 152 of FIGS. 7A-10C of parallelogram or trapezoidal cross section which is useful for samples such as pastes, glues, tapes and lubricating greases (not shown). The lower half, comprising a base 118 and a vertical wall 120 with a horizontal shelf 122, is held to the upper half comprising an opposed vertical wall 124 with a horizontal portion 126, via the bolt and nut arrangement 130, 132, with the two halves further secured via the bolts 136. The sample holder 22 is positioned on the translation stage 14 via the receptacle or recess 144 on to the mounting pin 16 shown in FIG. 1. The blocking plate or shield member 138 at one end of the base 118 with a vertical slit 140 is affixed to the self adhering holder 22 via pin 142 and associated screw (not shown) and acts to allow only energy which has transited and exited the end of the sample ATR plate to reach the spectrometer detector (not shown). The ATR plate (74, 98, 128 or 152) is seated on the holder 22 with the slit 140 aligned with the end of the ATR plate (74, 98, 128 or 152).

For operation the self adhering sample holder 22 is fitted with an ATR plate seated in the opposed grooves or recesses in the shelf 122 and horizontal portion 126, and a sample (not shown) applied to the plate, the position of the holder 22 optimized via adjustment of the X-Y-Z control or adjusting screws 38, 46 and 54 and further optimized by an angular adjustment in the X-Y plane. The spectrum is then determined.

Figure 6A:
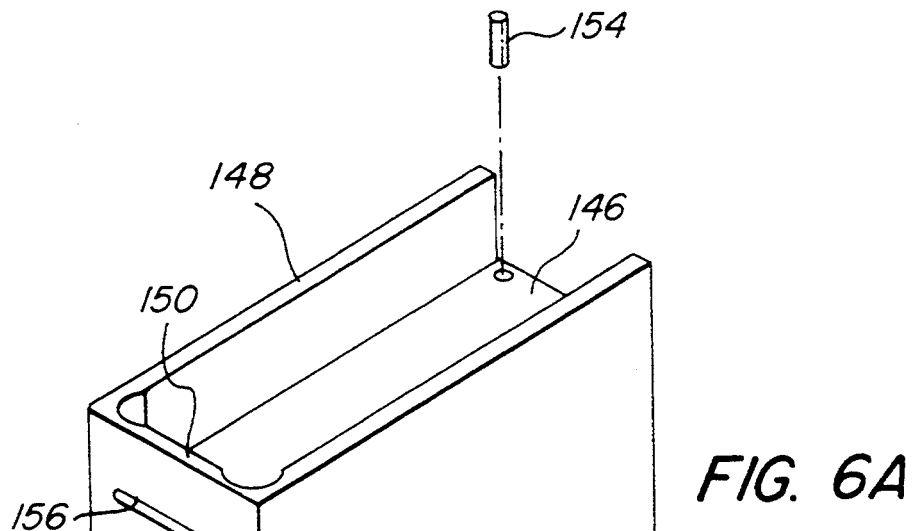
FIGS. 6A and 6B are perspective views of a sample holder for horizontal samples embodying the present invention and drawn to an enlarged scale.
Figure 6B:
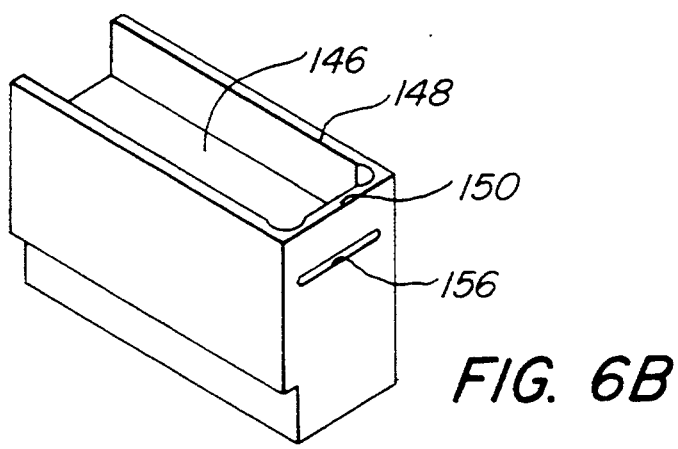
Figure 7A:
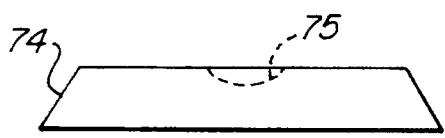
FIGS. 7A and 7B are an elevational view and a plan view, respectively, of all attenuated total reflectance crystal embodying the present invention, shown with a single recess and a trapezoidal shaped cross section, and drawn to an enlarged scale.
Figure 7B:
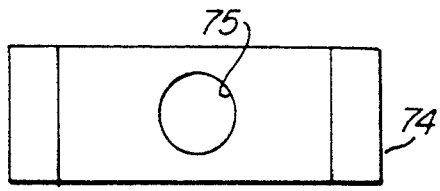
Figure 8A:
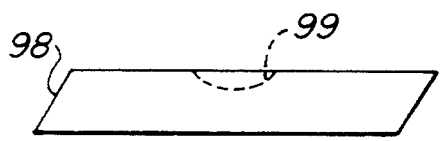
FIGS. 8A and 8B are an elevational view and a plan view, respectively, of an attenuated total reflectance crystal embodying the present invention, shown with a single recess and a parallelogram shaped cross section, and drawn to an enlarged scale.
Figure 8B:
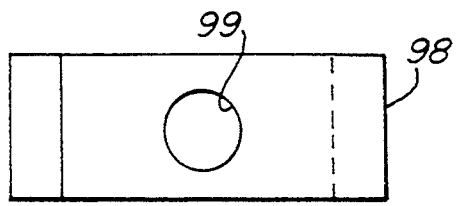
Figure 9A:
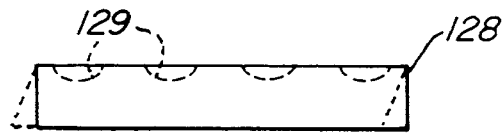
FIGS. 9A, 9B and 9C are elevational, plan and end views, respectively, of an attenuated total reflectance crystal embodying the present invention, shown with multiple recesses and a trapezoidal shaped cross section and drawn to an enlarged scale.
Figure 9B:
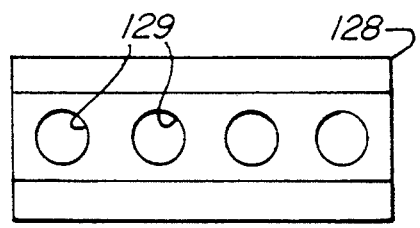
Figure 9C:
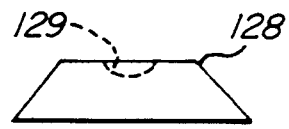
Figure 10A:
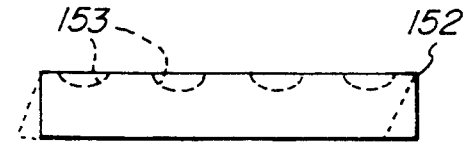
FIGS. 10A, 10B and 10C are elevational, plan and end views, respectively, of an attenuated total reflectance crystal embodying the present invention, shown with multiple recesses and a parallelogram shaped cross section, and drawn to an enlarged scale.
Figure 10B:
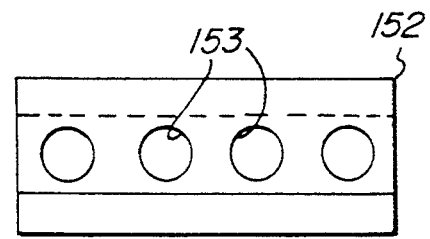
Figure 10C:
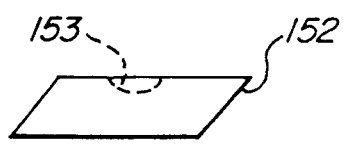

FIGS. 6A and 6B - the horizontal sample holder 24 is utilized to hold an ATR plate 74, 98, 128 or 152 of FIGS. 7A-10C, 50×20×2 mm of trapezoidal or parallelogram cross section, in a horizontal position upon which a liquid sample (not shown) is placed. Said liquid (not shown), if volatile, can be held in place via covering with a glass slide (not shown). The holder 24 is a one piece device comprising a base 146 with a pair of vertically extending side walls 148 and an upstanding shield extending between the vertically extending walls 148 150, with a location pin 154 to hold the ATR plate 74, 98, 128 or 152 in position. A receptacle hole or recess 158 fits on the locator pin 16—see FIG. 1—of the stage 14. The holder 24 possesses a horizontal slit 156 shield 150 aligned with an end of the ATR plate 74, 98, 128 or 152 which allows only energy which has transited or exited the end of the ATR crystal 74, 98, 128 or 152 seated on the holder 24 to reach the detector (not shown) of the spectrometer (not shown).

For operation the horizontal cell holder 24 is positioned on the translation stage 14 by means of the locator pin 16 and a liquid sample (not shown) is applied to the ATR plate 74, 98, 128 or 152. The energy thruput is optimized by adjustment of the X-Y-Z controls or positioning screws 38, 46, 54 and further optimized via a rotational adjustment in the X-Y plane. The spectrum is then determined.

FIGS. 7A, 7B, 8A, 8C depict ATR crystals 74, 98 which may also be utilized in the horizontal holder 24. The crystals 74, 98 which may be trapezoidal or parallelogram in cross section contain a small concavity 75 or 99 which is located in the center of the plate and can contain from 50 to 500 microliters. If the sample (not shown) contained is volatile, the concavity 75 or 79 can be covered with a small flat plate (not show, q) of the appropriate optical material. The concavity 75 or 79 may also be employed to follow the course of a chemical reaction in which the reactants (not shown) are placed in the cavity 75 or 79 and spectra are determined sequentially. Conventional ATR crystals may be used in the horizontal sample holder 24 and in the other holders 18, 20a, 22.

An additional variation of the plano-concave ATR plate is shown in FIGS. 9A-9C and 10A-10C in which a simple plate 128, 152 contains a multiplicity of concave positions 129, 153. These figures also reveal that a different geometry of ATR plate 128, 152 must be used in which the trapezoidal or parallelogram cross section is the width, not the length of the plate 128, 152. Also the holder 24 shown in FIG. 6 must be modified such that the slit (not shown) used to block energy runs the length of the holder 24. The same translational stage 14 can be utilized to position the plate 128 or 152 such that spectra can be acquired. It is of course necessary to reposition the ATR plate 128 or 152 in sequential fashion to examine each sample (not shown) in the several concave positions 129, 153. This method has obvious advantages of speed and economy when a large number of samples (not shown) must be analyzed.

Figure 11:
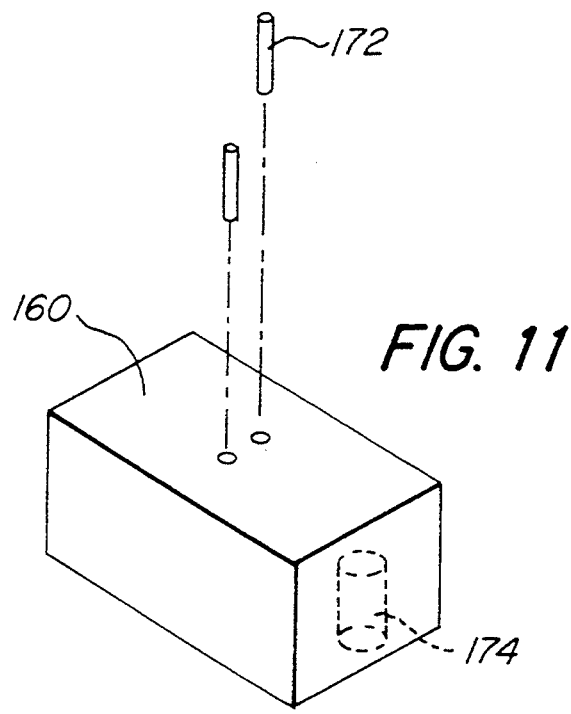
FIG. 11 is an exploded perspective view of a mounting block of a sample holder for micro samples embodying the present invention and drawn to an enlarged scale.

FIG. 11 depicts the mounting block or base 160 which is used for the determination of the spectra of micro samples (not shown). The block 160 is mounted on the translational stage 14 by means of the receptacle or recess 74 in the base 160 on the mounting pin 16—see FIG. 1. The two small mounting pins 172 are used to mount the various micro sampling devices or supports, generally designated by the numeral 162, films (not shown), plates (not shown), and liquid and gas cells (not shown).

Figure 12A:
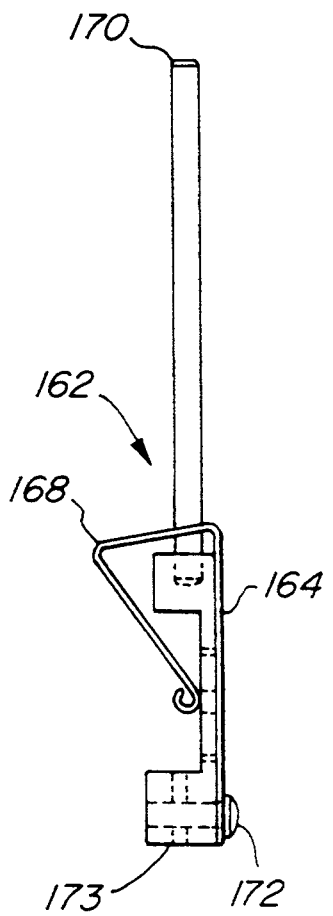
FIGS. 12A and 12B are an end view and a rear elevational view, respectively, of a micro holder of a sample holder for micro samples embodying the present invention and drawn to an enlarged scale.
Figure 12B:
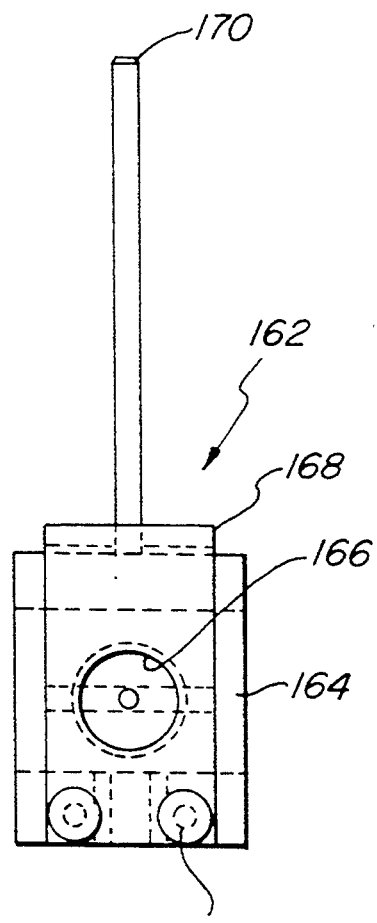

FIG. 12 depicts the small spring loaded cell or micro sample support 162 capable of holding small film (not shown) or plates (not shown) with smears (not shown). The side view, FIG. 12A, details the attachment of the spring or clip 168, the manual mounting pin, or handle 170, the cell body or vertical support plate 164 having an aperture 166, and the two receptacles 173 which engage the mounting pins 172 of the mounting block 160, see FIG. 11.

The devices which can be fitted to the above described X-Y-Z-X'-Y' positioner are by no means limited to those sample holders for liquid, solid and gas detailed. Those skilled in the arts will see many variations of the above described examples.

Having thus described the invention what is claimed is:

1. For use with an FTIR spectrometer having an infrared detector, a sample positioning assembly for positioning a sample to be analyzed in a precise position relative to the detector, comprising;
  (a) a base;
  (b) a stage movably supported on said base, said base including positioning means for moving said stage in X, Y and Z axes relative to said base;
  (c) a sample holder supported on said stage for movement therewith;
  (d) means mounting said holder on said stage for pivotal motion relative to said stage about the Z axis to direct the radiation passing through said sample holder to the detector; and
  (e) movement means on said stage for pivoting said sample holder in the X-Y plane relative to said stage and for retaining said sample holder in a controlled position relative to said stage.

2. The sample positioning assembly in accordance with claim 1 wherein said mounting means comprises a vertical pin on one of said stage and said sample holder and a recess in the other of said stage and said holder to pivotally seat said pin.

3. The sample positioning assembly in accordance with claim 2 wherein said stage has said pin thereon and said sample holder has said recess therein.

4. The sample positioning assembly in accordance with claim 1 wherein sample holder includes an attenuated total reflectance crystal seated thereon to support the sample.

5. The sample positioning assembly in accordance with claim 4 wherein said sample holder includes a shield at one end thereof having a slit therein aligned with an end of said crystal to essentially limit the radiation passing therethrough to the detector to light which has exited the end of said attenuated total reflectance crystal.

6. The sample positioning assembly in accordance with claim 1 wherein said movement means includes a pair of threadably adjustable members disposed on opposite sides of said sample holder.

7. The sample positioning assembly in accordance with claim 6 wherein said adjustable members have a tip at one end bearing on the sides of said sample holder and are mounted for movement towards and away from each other to pivot said holder relative to said stage and to retain said holder in said controlled position.

8. The sample positioning assembly in accordance with claim 1 wherein said sample holder has:
(a) a base;
(b) a first vertical wall on said sample holder base;
(c) a second vertical wall on said sample holder base opposing said first vertical wall;
(d) an attenuated total reflectance crystal positioned between said walls; and
(e) a shield member at one end of said walls having a vertical slit aligned with an end of said crystal to essentially limit the radiation passing therethrough to the detector to radiation which has exited the end of said attenuated total reflectance crystal.

9. The sample positioning assembly in accordance with claim 8 including releasable means securing said walls and shield member in assembly.

10. The sample positioning assembly in accordance with claim 8 wherein at least one of the opposed surfaces of said vertical walls has a recess therein providing a compartment for holding a sample in contact with said crystal.

11. The sample positioning assembly in accordance with claim 10 wherein said opposed walls have recesses therein and said recesses are aligned.

12. The sample positioning assembly in accordance with claim 1 wherein said sample holder includes:
(a) a base member having a generally horizontal shelf intermediate its height and a wall extending vertically upwardly therefrom;
(b) an upper member having a wall seated upon said wall of said base member and providing a generally horizontal portion extending above said shelf, said shelf and portion having opposed and aligned recesses;
(c) an attenuated total reflectance crystal seated in said aligned recesses; and
(d) a shield member at one end of said base and upper members having a vertical slit aligned with said crystal to essentially limit the radiation passing therethrough to the detector to radiation which has exited an end of said attenuated total reflectance crystal.

13. The sample positioning assembly in accordance with claim 1 wherein said sample holder includes:
(a) a base member having a horizontal portion, a pair of vertically extending walls on opposite sides thereof and a shield at one end thereof extending between said vertically extending walls; and
(b) a horizontally disposed attenuated total reflectance crystal seated on said horizontal portion between said walls, said shield having a horizontal slit aligned with said crystal to essentially limit the radiation passing therethrough to the detector to radiation which exits an end of said attenuated total reflectance crystal.

14. The sample positioning assembly in accordance with claim 1 wherein said sample holder includes:
(a) a base member having mounting means on its upper surface; and
(b) a microsample support on said mounting means of said member and having a vertical support plate with an aperture therein.

15. For use with an FTIR spectrometer having an infrared detector, a sample positioning assembly for positioning a sample to be analyzed in a precise position relative to the detector, comprising:
(a) a base;
(b) a stage movably supported on said base, said base including positioning means for moving said stage in X, Y and Z axes relative to said base;
(c) a sample holder supported on said stage for movement therewith;
(d) means mounting said holder on said stage for pivotal motion relative to said stage about the Z axis to direct the radiation passing through said sample holder to the detector comprising a vertical pin on one of said stage and said sample holder and a recess in the other of said stage and sample holder; and
(e) a pair of threadably adjustable members disposed on said stage on opposite sides of said sample holder for pivoting said sample holder on said pin in the X-Y plane relative to said stage and for retaining said sample holder in a controlled position relative to said stage.

16. The sample positioning assembly in accordance with claim 15 wherein said stage has said pin thereon and said sample holder has said recess therein.

17. The sample positioning assembly in accordance with claim 15 wherein said sample holder includes an attenuated total reflectance crystal seated thereon to support a sample and a shield at one end thereof having a slit therein aligned with an end of said crystal to essentially limit the radiation passing therethrough to the detector to light which has exited the end of said attenuated total reflectance crystal.

18. The sample positioning assembly in accordance with claim 17 wherein said adjustable members have a tip at one end bearing on the sides of said sample holder and are disposed in a position spaced between said pivot pin and said shield and are mounted for movement towards and away from each other to pivot said holder relative to said stage and to retain said holder in said controlled position.

* * * * *